US008064110B2

(12) United States Patent
Noyes et al.

(10) Patent No.: US 8,064,110 B2
(45) Date of Patent: Nov. 22, 2011

(54) ADAPTIVE AUTO WHITE BALANCE

(75) Inventors: Ying Xie Noyes, San Diego, CA (US); Szepo Robert Hung, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1109 days.

(21) Appl. No.: 11/404,477

(22) Filed: Apr. 13, 2006

(65) Prior Publication Data

US 2007/0133071 A1 Jun. 14, 2007

Related U.S. Application Data

(60) Provisional application No. 60/748,732, filed on Dec. 18, 2005.

(51) Int. Cl.
*G06T 5/00* (2006.01)
*H04N 1/407* (2006.01)
*H04N 1/409* (2006.01)

(52) U.S. Cl. ...... 358/504; 358/3.24; 358/3.26; 358/505; 358/518

(58) Field of Classification Search .................. 358/1.9, 358/500, 504, 515, 516, 518, 3.24, 3.26, 358/505

See application file for complete search history.

(56) References Cited

U.S. PATENT DOCUMENTS 6,295,087 B1 9/2001 Nohda
6,727,942 B1 * 4/2004 Miyano ...................... 348/223.1
6,952,225 B1 10/2005 Hyodo et al.
7,019,776 B1 * 3/2006 Lin ........................... 348/223.1
7,184,080 B2 2/2007 Kehtarnavaz et al.
2004/0239795 A1 * 12/2004 Kitajima ...................... 348/362
2005/0025357 A1 * 2/2005 Landwehr et al. ............ 382/170
2005/0243186 A1 * 11/2005 Hayaishi .................... 348/223.1
2006/0269136 A1 * 11/2006 Squires et al. ............... 382/181

FOREIGN PATENT DOCUMENTS

EP 0658058 A2 6/1995
EP 0738085 10/1996
JP 08251620 9/1996
JP 2000092509 3/2000
JP 2001112019 4/2001
JP 2005033434 2/2005
JP 2005223511 8/2005

OTHER PUBLICATIONS

International Search Report and Written Opinion—PCT/US2006/061818, International Search Authority—European Patent Office—Jan. 24, 2008.

Taiwanese Search Report—No. 095146034—TIPO, Mar. 8, 2010.

* cited by examiner

*Primary Examiner* — James A Thompson

(74) *Attorney, Agent, or Firm* — Timothy F. Loomis; James R. Gambale, Jr.

(57) ABSTRACT

An imaging system generates a gain for a component of an image format. The gain is at least partially dependent on the brightness of the light source illuminating a scene when an image of the scene was generated. The gain can be used to correct the component of the image format for the color shift in the image caused by the light source. In some instances, the imaging system generates a gain for a plurality of the components of the image format or for all of the components of the image format. The gains can be used to correct the components for the color shift in the image caused by the light source.

27 Claims, 5 Drawing Sheets

Determine the brightness of the light source illuminating the scene at the time the image was generated. 234
Receive data for gray regions that are each associated with a potential light source. 230
Use brightness to determine the weight factors for the reference light sources. 236
Use the data for the gray regions to generate the potential gray components for each potential light source. 232
Combine the factors and the potential gray components to generate the weighted gray components. 238
Use the weighted gray components to generate the gains. 240

ADAPTIVE AUTO WHITE BALANCE

CLAIM OF PRIORITY UNDER 35 U.S.C. §119

The present Application for Patent claims priority to Provisional Application No. 60/748,732 entitled "ADAPTIVE AUTO WHITE BALANCE WITH WEIGHTING VECTORS," filed on Dec. 18, 2005, assigned to the assignee hereof, and hereby expressly incorporated by reference herein in its entirety.

BACKGROUND

1. Field

The present invention relates to imaging systems and more particularly to auto white balance in imaging systems.

2. Background

Digital images are generated under different lighting conditions. Different light sources produce different color shifts in the image. Automatic white balance (AWB) techniques have been employed to correct these images for the color shift. AWB techniques generally employ formatted image data for the color gray to identify the light source for the image. The image data is then corrected for the color shift associated with the identified light source. However, current AWB techniques can be confused when identifying the light source. For instance, the color blue photographed under fluorescent light has a color signature similar to the color gray photographed under sunlight. As a result, current AWB techniques can mistake an image of blue illuminated by a fluorescent light for an image taken in the sunlight. As a result, there is a need for improvements in correction of color shift caused by light sources.

SUMMARY

An imaging system generates a gain for a component of an image format. The gain is at least partially dependent on the brightness of the light source illuminating a scene when an image of the scene was generated. The gain can be used to correct the component of the image format for the color shift in the image caused by the light source. In some instances, the imaging system generates a gain for a plurality of the components of the image format or for all of the components of the image format. Each gain can be used to correct a component for the color shift in the image caused by the light source.

One embodiment of the system is a mobile camera phone. The phone includes electronics for determining brightness of a light source illuminating a scene when an image of the scene was generated. The phone also includes electronics for employing the brightness to determine a plurality of weight factors. Each weight factor indicates the probability that a different light source was the light source illuminating the scene at the time the image was generated. The phone also includes electronics for generating a weighted gray component for a component of an image format. The weighted gray component is a component of an image format. Additionally, the weighted gray components can be a weighted average of potential gray components that are each associated with a different potential light source with a known light intensity. The value of the potential gray component associated with a particular potential light source indicates the value that the component would have for the color gray illuminated by that potential light source. The potential gray components in the weighted average are weighted by the factor indicating the probability that the potential light source associated with that potential gray component was the light source illuminating the scene at the time the image was generated with a known light intensity level. The phone also includes electronics for using the weighted gray component to generate a gain for the component of the image format and electronics for using the gain to correct the component for a color shift in the image caused by the light source illuminating the scene at the time the image was generated.

DETAILED DESCRIPTION

An imaging system generates a gain for one or more component of an image format. Each gain can be used to correct a component of the image format for the color shift in an image of a scene. The color shift can be caused by the light source that was illuminating the scene when the image was taken. Each gain is at least partially dependent on the brightness of the light source illuminating the scene. For instance, the gains that are determined for a particular set of image data may be different depending on the brightness of the light source. Taking brightness into account when generating the gains enhances the odds that the color shift correction will be based on the correct light source. For instance, bright images are more likely to be taken outside with sunlight as the light source while less bright images are more likely taken inside in a tungsten or fluorescent light source. As a result, the brightness provides an indication of the light source that was illuminating the scene.

The gains can be generated using weight factors that are each associated with a different light source. Each weight factor indicates the probability that the associated light source was the light source illuminating the scene at the time the image was generated. The weight factors can each be a function of the brightness of the light source illuminating the scene. As a result, the brightness of the light source illuminating the scene can be employed to determine the weight factor associated with different light sources. The gains can be a function of data for a plurality of different light sources where the data for each light source is weighted by the weight associated with that light source. Accordingly, the gains can be generated from data for the different light sources weighted by the probability that each light source was the light source actually illuminating the scene at the time the image was generated.

The use of the brightness can overcome the confusion between the color blue photographed under fluorescent light and the color gray photographed under sunlight. For instance, when the light source illuminating the scene was very bright, the system will give sunlight more weight than the fluorescent light. Accordingly, the gains will primarily reflect sunlight as the dominant light source and the image data will be corrected for a color shift that is primarily from sunlight. When the light source illuminating the scene was much less bright, the system will give the fluorescent light a higher weight than sunlight. Accordingly, the gains will primarily reflect fluorescent light as the dominant light source and the image data will be corrected for a color shift that is primarily from fluorescent light.

The weight factors present the system with a simple tuning method. For instance, the weight factors can be changed to tune the influence of different light sources at different brightness levels.

Figure 1:
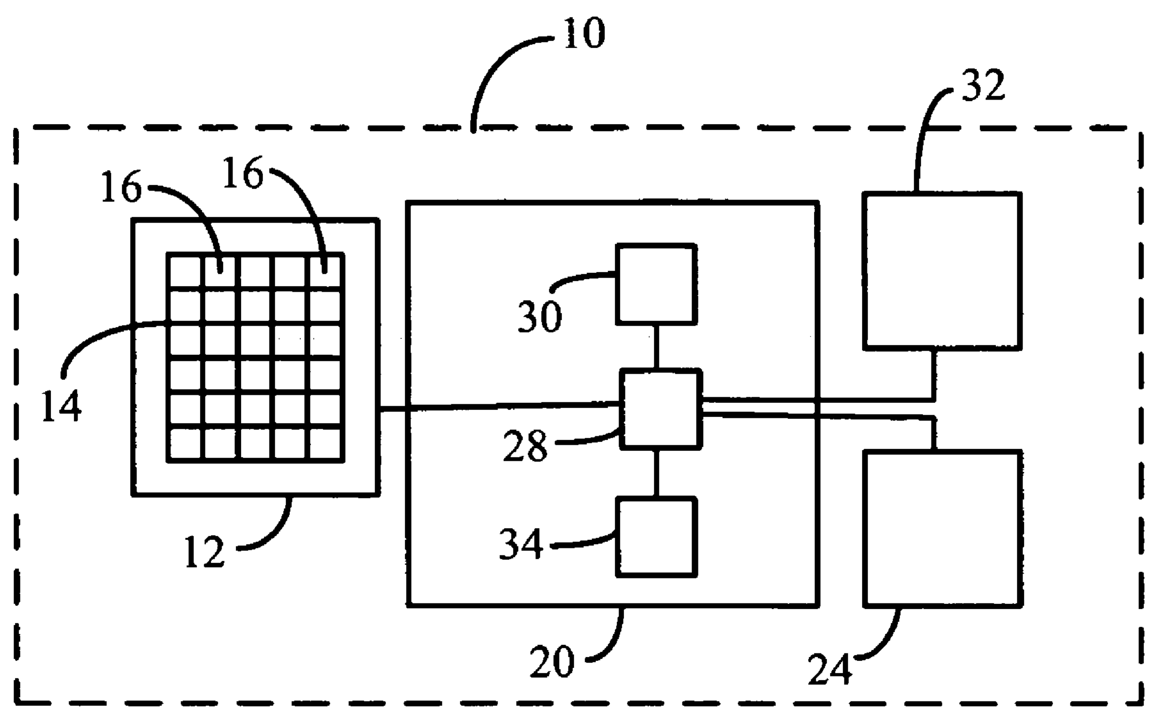
FIG. 1 is a block diagram of an imaging system.

FIG. 1 is a block diagram of an imaging system 10. The imaging system 10 includes an image sensor 12 having an array of pixels 14 that are each associated with a light sensor 16. In some instances, the pixels are arranged in two-dimensional array of columns and rows. Examples of image sensors include, but are not limited to, CMOS (Complimentary Metal Oxide Semiconductor) sensor chips and CCD (Charge Coupled Device) sensor chips.

The imaging system includes electronics 20 configured to receive image data from the image sensor 12. The image data describes an image of a scene. The electronics 20 correct the image data for color shift resulting from the light source that was illuminating the scene when the image was generated. The electronics can use the corrected image data to regenerate the image and output the results on one or more output devices 24. Suitable output devices 24 include, but are not limited to, computer systems, printers, transmitters, networks such as the Internet, and displays such as camera displays, video phone displays, video screens, and computer screens. Although the one or more output devices 24 are shown as being part of the imaging system 10, the one or more output devices 24 can be outside of the imaging system.

The electronics 20 include a processor 28 in communication with a memory 30. The memory 30 can be any memory device or combination of memory devices suitable for read/write operations such as storing images and data associated with images.

The processor is in electrical communication with supplemental electronics 32. The supplemental electronics 32 can be electronics elsewhere in the system that provide data to the electronics 20 and/or receive data from the electronics 20. For instance, the supplemental electronics 32 can be a video-front-end. In some instances, supplemental electronics 32 include one or more processors and/or one or more memories. The electronics 20 can access the supplemental electronics 32 for data about the image. For instance, the electronics 20 can access the supplemental electronics for data about the brightness of the light source that was illuminating the scene at the time the image was generated. Although the supplemental electronics 32 are shown as being separate from the electronics, the supplemental electronics and the electronics can be integrated.

The methods and apparatus of this invention may take the form, at least partially, of program logic or program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, through a wireless interface or via any other form of transmission. When the program code is received and loaded into and executed by a machine, such as a processor, the machine becomes an apparatus for practicing the invention. When implemented on a general-purpose processor, the program code combines with the processor to provide a unique apparatus that operates analogously to specific logic circuits. In some instances, the electronics include a computer-readable medium 34 in communication with the processor 28. The computer-readable medium can have a set of instructions to be executed by the processor. Although the computer-readable medium 34 is shown as being different from the memory 30, the computer-readable medium 34 can be the same as the memory 30.

A suitable processor 28 includes, but is not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Suitable computer-readable media 34 include, but are not limited to, optical discs such as CDs, magnetic storage diskettes, Zip disks, magnetic tapes, RAMs, and ROMs. In some instances, the computer-readable medium 34 is located outside of the imaging system. For instance, the computer-readable medium can be connected to a server computer on a computer network. In some instances, the computer-readable medium 34 is not required.

Examples of suitable imaging systems 10 include, but are not limited to, digital cameras, video cameras, mobile camera phones, medical imaging devices. The imaging system can also be a computer system configured to store image data. Examples of suitable computer systems include, but are not limited to, a personal computers and servers. In some instances, the imaging system does not include the image sensor. For instance, when the imaging system is a computer system, the image sensor is not necessarily included in the imaging system. When the image sensor is not included in the imaging system, the image sensor can be independent from the imaging system but can be placed in communication with the imaging system to permit the electronics to receive the sensor values.

Figure 2:
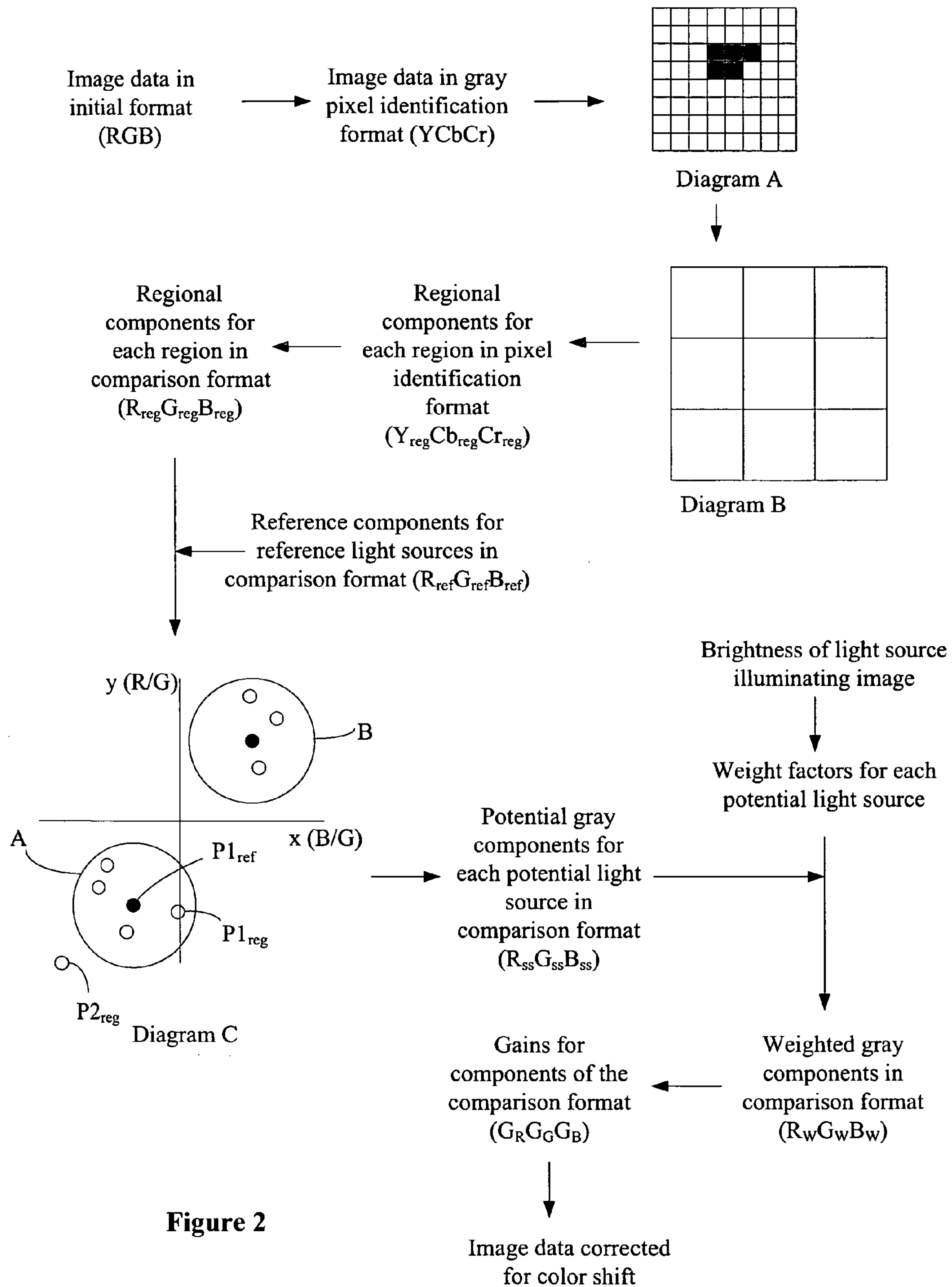
FIG. 2 illustrates progression of image data through the imaging system of FIG. 1.

FIG. 2 illustrates progression of image data through an imaging system such as the imaging system of FIG. 1. The image data can be in an image format such as the RGB format or the YCbCr format. Image formats include different components. For instance, the RGB format includes an R component, a G component and a B component while the YCbCr image format includes a Y component, a Cb component and a Cr component. In most instances, each of the components of an image format represents an optical characteristic of the image. For instance, in the RGB format, the R component represents the red component of a pixel, the G component represents the green component of a pixel, and the B component represents the blue component of a pixel. In the YCbCr format, Y represents the luminescence component of a pixel while Cb and Cr each represent chrominance components of the pixel. As a result, a set of image components generally describes the optical characteristics of a pixel. However, the electronics employ the components of the image formats to describe items other than individual pixels. For example, the optical characteristics of a region that includes multiple pixels can be described using the components of an image format. As a result, a region of the image can be described using an R component (Rreg), a G component (Greg), and a B component (Breg).

During generation of an image, the electronics receive image data from the image sensor. The electronics can store the image data in the memory. The image data can be in an initial format such as the RGB format. For the purposes of illustration, FIG. 2 starts with image data in the RGB format. The electronics can convert the raw data format to a gray pixel identification format. The electronics employ the image data in the gray pixel identification format to identify potentially gray pixels. As a result, the identification format may be more suitable for identifying gray pixels than the initial format. In instances where the initial format is suitable for identifying potentially gray pixels, the conversion of the image data from the initial format to the identification format may not need to be performed. As a result, the conversion of the image data from the initial format to the identification format is optional. A suitable identification format includes, but is not limited to, YCbCr format. FIG. 2 illustrates the image data in the initial RGB format being converted to image data in the YCbCr format.

The electronics employ the image components in the gray identification format to identify potentially gray pixels. For instance, the electronics can compare one or more components of the identification format for a pixel to one or more criteria to determine whether the pixel is a potentially gray pixel. When the identification format is the YCbCr format, the electronics can select pixels with a Y value in a range. The range of values for Y can be established such that pixels that are too dark or too bright are removed from the pool of potentially gray pixels. The electronics can then identify the selected pixels that satisfy one or more criteria that are each a function of Cr and/or Cb. The identified pixels serve as potentially gray pixels. Suitable criteria for identifying a gray pixel can be expressed as equations. For instance, pixels with YCbCr components that satisfy the following six equations can be considered potentially gray pixels.

$$Y \leqq Y_{max}. \qquad \text{Equation 1:}$$

$$Y \geqq Y_{min}. \qquad \text{Equation 2:}$$

$$Cb \leqq m1*Cr+c1. \qquad \text{Equation 3:}$$

$$Cr \geqq m2*Cb+c2. \qquad \text{Equation 4:}$$

$$Cb \geqq m3*Cr+c3. \qquad \text{Equation 5:}$$

$$Cr \leqq m4*Cb+c4. \qquad \text{Equation 6:}$$

The constants m1, m2, m3, m4, c1, c2, c3, and c4 can be selected to encourage accurate selection of potentially gray pixels while encouraging one or more potentially gray pixels to actually be identified for nearly all images. For the purposes of illustration, diagram A in FIG. 2 illustrates a portion of the pixels in an image. A portion of the pixels are grayed out and represent potentially gray pixels. Although Equations 1 through 6 are illustrated as being separate equations, the equations can be combined. For instance, equation 1 and equation 2 can be expressed as $Y_{min} \leqq Y \leqq Y_{max}$.

In some instances, only a portion of the pixels are processed to identify if they are potentially gray pixels. In larger images or images having large amounts of data, the processing time can be reduced by sampling fewer than all of the pixels. For example, every other pixel in the horizontal and/or vertical direction can be tested to see if it is a gray pixel.

The electronics can partition the image into regions or blocks. For instance, diagram B in FIG. 2 illustrates a portion of the image partitioned into regions. Each region can include a plurality of pixels. For instance, the portion of the image illustrated in diagram A of FIG. 2 can serve as one of the regions in diagram B of FIG. 2. In one example, each region includes (image width in pixels/16) pixels by (image height in pixels/16) pixels and, in another example, each region includes (image width in pixels/8) pixels by (image height in pixels/8) pixels. In another example, each region includes a single pixel. Accordingly, the following discussion can be performed with each region representing an individual pixel.

The electronics can determine regional components for each region including one of the potentially gray pixels. Each regional component can correspond to a component of the identification format. For instance, the regional components can be in the identification format. As a result, the regional components can be the same as the components of the identification format. As an example, when the identification format is the YCbCr format, the regional components can include a regional Y component ($Y_{reg}$), a regional Cb component ($Cb_{reg}$), and a regional Cr component ($Cr_{reg}$). Accordingly, the regional Y component ($Y_{reg}$) corresponds to the Y component of the identification format, the regional Cb component ($Cb_{reg}$) corresponds to the Cb component of the identification format, and the regional Cr component ($Cr_{reg}$) corresponds to the Cr component of the identification format.

Each regional component can each be generated so it represents the corresponding component for the potentially gray pixels in a region. For instance, the electronics can: generate a regional Y component ($Y_{reg}$) for a region by averaging the Y values for the potentially gray pixels in the region; generate a regional Cb component ($Cb_{reg}$) for a region by averaging the Cb values for the potentially gray pixels in the region, and generate a regional Cr component ($Cr_{reg}$) for a region by averaging the Cr values for the potentially gray pixels in that region. Alternately, the electronics can: use the median of the Y values for the potentially gray pixels in a region as a regional Y component ($Y_{reg}$); use the median of the Cb values for the potentially gray pixels in a region as a regional Cb component ($Cb_{reg}$), and use the median of the Cr values for the potentially gray pixels in a region as a regional Cr component ($Cr_{reg}$). Because some of the regions may not include any gray pixels, at least a portion of regions are each associated with regional components.

The electronics can convert the regional components from the identification format to a comparison format. The electronics employ the comparison format to determine whether each of the regions associated with regional components is a gray region. As a result, the comparison format may be more suitable for identifying gray regions than the identification format. In the example shown in FIG. 2, the electronics convert regional components in the YCbCr format into regional components in the RGB format using the conventional conversion between the RGB and YCbCr formats. The conversion results in a regional R component ($R_{reg}$), a regional G component ($G_{reg}$), and a regional B component ($B_{reg}$). In some instances, the identification format is suitable for use as the comparison format. As a result, the conversion of the regional components from the identification format to the comparison format may not be required. Further, the comparison format can be the same as the initial format. For instance, the initial format and the comparison format can both be the RGB format as is illustrated in FIG. 2.

The electronics can compare the regional components to reference data for different light sources. Examples of different light sources include, but are not limited to, incandescent sources, halogen sources, tungsten sources, fluorescent sources, daylight at different times of day and/or daylight under different conditions. A light source can be a combination of light sources such as a combination of daylight and fluorescent light. The reference data can be stored in the memory. The reference data can be stored in the memory.

The reference data can include reference components associated with each light source. Each reference component can correspond to a component of the comparison format. For instance, the reference components can be in the comparison format. As a result, the reference components can be the same as the components of the comparison format. As an example, when the comparison format is the RGB format, the reference components can include a reference R component ($R_{ref}$), a reference G component ($G_{ref}$), and a reference B component ($B_{ref}$). Accordingly, the reference R component ($R_{ref}$) corresponds to the R component in the comparison format, the reference G component ($G_{ref}$) corresponds to the G component in the comparison format, and the reference B component ($B_{ref}$) corresponds to the B component in the comparison format. The reference components for a light source represent the color gray appears when illuminated by that light source. Accordingly, the reference components for a light source describe the optical characteristics of the color gray when illuminated by that light source.

The reference data can be generated by generating images of a gray scene where each image is illuminated by a light source for which reference data is desired. The gray scene can be a flat field that is uniformly illuminated. In some instances, more than one image can be generated for the same light source. The images are generated in the comparison format or are converted to the comparison format. The comparison format for an image is processed to identify the reference components that represent the color gray illuminated by that light source. For instance, the reference R value for a light source can be an average of the R values for different pixels in one or more of the image illuminated by the light source. Alternately, the reference R value for a light source can be the median of the R values for different pixels in one or more of the image illuminated by the light source.

The regional components are compared to the reference components to identify gray regions. The comparison can make use of the distance between different points in the comparison format space. RGB is a color format. As a result, when the comparison format is the RGB format, the comparison format space is RGB color space. Accordingly, when the comparison format is RGB format, the comparison can make use of the distance between different points in the RGB color space.

Diagram C in FIG. 2 is a two-dimensional diagram illustrating the RGB color space with an x-axis representing B/G and a y-axis representing R/G. A reference point is shown as a solid circle labeled $P\mathbf{1}_{ref}$. The reference point illustrates the location of the reference components for one of the light sources in RGB color space. For instance, the reference point labeled $P\mathbf{1}_{ref}$ can be located at the $R_{ref}$, $G_{ref}$, and $B_{ref}$ associated with a fluorescent light source. Region points are illustrated as hollow circles. A region point illustrates the location of that region in the comparison format space. For instance, the region point labeled $P\mathbf{1}_{reg}$ can be located at ($R_{reg}/G_{reg}$, $B_{reg}/G_{reg}$) as determined from the $R_{reg}$, $G_{reg}$, and $B_{reg}$ associated with one of the regions illustrated in diagram B of FIG. 2. Although diagram C in FIG. 2 shows a two-dimensional diagram, the comparison format space can also be expressed in more than two dimensions. For instance, the RGB color space can be three-dimensional with an x-axis representing the R component, the y-axis representing the G component, and the y-axis representing the B component.

The reference data can include a distance limit associated with each of the light sources. In some instances, the distance limit is the same for each of the light sources. The distance limits can be stored in the memory. In some instances, the distance limits are included in the reference data.

The electronics can determine the distance between a region point and the nearest reference point for each of the region points. The determined distances can each serve as a comparison distance. The comparison distance for a region can be compared to the distance limit associated with the nearest reference point. When the comparison distance falls within the distance limit, the region associated with that region point is classified as a gray region and the regional data for that region point is retained for future calculations. When the comparison distance exceeds the distance limit, the region associated with that region point does not serves as a gray region and the regional data for that region point can be withheld from future calculations. The process of identifying gray regions can be repeated for each of the region points.

The process of identifying gray regions can be illustrated as centering a circle at each of the reference points and excluding the region points located outside of the circles. The diameter of the circle around a particular reference point is equal to the distance limit associated with that reference point. For the purposes of illustration, diagram C in FIG. 2 includes a circle centered at the reference point labeled $P\mathbf{1}_{ref}$ and surrounding several region points. The region points outside of the circle can be discarded. For instance, the region point labeled $P\mathbf{2}_{reg}$ is outside of the circle and can be discarded from further calculations.

The process of identifying gray regions can serve as a secondary filter and the process for identifying the potentially gray pixels can serve as the primary filter. The secondary filter process can help to ensure that the regional components are for regions that actually contain gray pixels. For instance, the primary filter process can erroneously identify certain green pixels and certain yellow pixels as being potentially gray pixels. Because the secondary filter process requires that the regional components be near the reference components for a gray color, the secondary filter process can remove regions that contain erroneously identified potentially gray pixels.

The electronics use the gray regions to identify potential light sources. For instance, the electronics can identify clusters of region points around reference points. As noted with respect to diagram C in FIG. 2, the distance limit associated with a reference point can be illustrated as a circle around a reference point in the comparison format space. The region points within a circle belong to a cluster of region points. The region points within different circles belong to different clusters. In some instances, a region point may lie within circles associated with two different clusters and it may not be clear to which cluster the region point belongs. In these instances, the region point can be designated as belonging to the cluster associated with the reference point closest to that region point. Diagram C in FIG. 2 illustrates a cluster labeled A and a cluster labeled B. The gray regions in a cluster are each associated with the reference point about which the gray regions are clustered. Since each reference point is associated with a light source, each gray region is also associated with a light source. The number of gray regions associated with a light source can be compared against a threshold number. Light sources associated with a number of gray regions exceeding the threshold number are classified as a potential light source that may have been the actual light source illuminating the scene at the time the image was taken. For instance, the image illustrated in diagram C could have been illuminated by the light source associated with gray regions in the cluster labeled A and/or with the light source associated with gray regions in the cluster labeled B. In some instances, one or more light sources will be associated with a number of gray regions less than or equal to the threshold number of gray regions. These light sources will not be classified as potential light sources. The threshold number of gray regions that need to be associated with a light source for that light source to be classified as a potential light source can be zero, one and/or more than one.

The electronics generate potential gray components for each of the potential light sources. Each potential gray component can correspond to a component of the comparison format. Accordingly, the potential gray components can be the same as the components of the comparison format. As an example, when the comparison format is the RGB format, the potential gray components can include a potential gray R component ($R_{ss}$), a potential gray G component ($G_{ss}$), and a potential gray B component ($B_{ss}$). Accordingly, the potential gray R component ($R_{ss}$) corresponds to the R component in the comparison format, the potential gray G component ($G_{ss}$) corresponds to the G component in the comparison format, and the potential gray B component ($B_{ss}$) corresponds to the B component in the comparison format.

The values of the potential gray components for a particular potential light source is an approximation of the values that the format components would have for the color gray when it is illuminated by that potential light source. Accordingly, the electronics generate the potential gray components for a particular potential light source such that they characterize the optical characteristics for the gray regions associated with that potential light source. As a result, the potential gray components for a potential light source can be a function of the regional components for the gray regions associated with that potential light source. For instance, a potential gray component for a potential light source can be an average of the corresponding regional components for the gray regions associated with that potential light source. As an example, Rss for a potential light source can be an average of the Rreg values associated with that light source. Alternately, a potential gray component for a potential light source can be the median of the corresponding regional components for the gray regions associated with that potential light source.

The electronics use the potential gray components to determine weighted gray components. Each weighted gray component can correspond to a component of the comparison format. The weighted gray components can be the same as the components of the comparison format. As an example, when the comparison format is the RGB format, the weighted gray components can include a weighted R component ($R_w$) a weighted G component ($G_w$), and a weighted B component ($B_w$). Accordingly, the weighted R component ($R_w$) corresponds to the R component in the comparison format, the potential gray G component ($G_w$) corresponds to the G component in the comparison format, and the potential gray B component ($B_w$) corresponds to the B component in the comparison format.

The electronics also use weight factors to determine the weighted gray components. Each of the potential light sources can be associated with a weight factor. The weight factors can indicate the probabilities that the potential light source associated with the factor was the light source illuminating the scene when the image of the scene was generated. For instance, a weight factor can indicate the relative probability whether the actual light source for an image is a tungsten light source or a daylight.

The weight factor associated with a light source can be at least partially dependent on the brightness of the light source illuminating a scene when the image of the scene was taken. For instance, Table 1 presents possible weight factors for different brightness levels. At high brightness levels, the weight factors for daylight are higher than the weight factors for tungsten light source and/or fluorsecent light sources. This weighting reflects the increased probability that very bright images are taken outdoors. For instance, weighting daylight at 200 while weighting a tungsten light source at 1 indicates that the relative probability that the image was illuminated by sunlight is 200 times the probability that the image was illuminated by a tungsten light source. At low brightness levels, the weight factors for daylight are lower than the weight factors for tungsten light source and/or incandescent light sources. This weighting reflects the increased probability that images generated under dimmer condition are taken indoors. For instance, weighting daylight at 1 while weighting a tungsten light source at 2 indicates that the relative probability that the image was illuminated by sunlight is half the probability that the image was illuminated by a tungsten light source. Accordingly, the weight factors indicate the probability that the image was illuminated by a particular one of the potential light sources.

TABLE 1

| | Brightness | | |
|---|---|---|---|
| Light source | Low brightness | High brightness | Mid-range brightness |
| Sunlight under first condition | 1 | 200 | 30 |
| Sunlight under second condition | 1 | 200 | 30 |
| Tungsten | 2 | 1 | 1 |
| Incandescent | 10 | 15 | 5 |
| First sample of fluorescent | 6 | 10 | 3 |

Data associating each light source with a weight factor that is at least partially dependent on brightness can be stored in the memory. In some instances, the data that associates each light source with a weight factor is included with the reference data. For instance, the reference data can include a look-up table including data such as the data presented in Table 1.

The electronics can determine the image brightness from the auto-exposure control logic. Auto-exposure control logic is included in the second electronics disclosed in FIG. 1. Many imaging devices such as cameras include the second electronics in a video front-end (VFE). The electronics can determine a weight factor for each potential light source by comparing the brightness to the data associating each light source with a weight factor that is at least partially dependent on brightness. For instance, the electronics can compare a low brightness to the data in Table 1 to determine that the weight factor for sunlight under the first condition is 1. In determining the weight factors, the electronics need not actually use brightness but can use other variables and/or signals that indicate brightness or that are related to the brightness.

The electronics employ the weights and the potential gray components to generate weighted gray components. The weighted gray components can each correspond to a component of the comparison format. As an example, when the comparison format is the RGB format, the weighted gray components can include a weighted R component ($R_w$), a weighted G component ($G_w$), and a weighted B component ($B_w$).

The weighted gray components represent the potential gray components associated with one or more light sources weighted by the probability that the light source associated with each potential gray component was the actual light source for the image. As a result, the weighted gray components are an approximation of the components that would belong to the gray pixels in the image.

The electronics can generate a weighted gray component by generating a weighted average of the corresponding potential gray components. Each potential gray component in the weighted average can be weighted by the factor indicating the probability that the potential light source associated with that potential gray component is also the light source illuminating the scene at the time the image was generated. As an example, a potential gray R component for the light source associated with the cluster labeled A can be designated $R_{ss,A}$ and the potential gray R component for the light source associated with the cluster labeled B can be designated $R_{ss,B}$, the weight factor for the light source associated with the cluster labeled A can be designated $W_A$, and the weight factor for the light source associated with the cluster labeled B can be designated $W_B$. Using these designations, the weighted R component ($R_w$) can be determined as $R_w=(W_A*R_{ss,A}+W_B R_{ss,B})/(W_A+W_B)$. As a result, the weighted gray components are a function of the weight factors and the potential gray components.

The electronics employ the weighted gray components to determine gains for the components of the comparison format. The gains can each correspond to a component of the comparison format. As an example, when the comparison format is the RGB format, the gains can include a gain for the R component ($G_R$), a gain for the G component ($G_G$), and a gain for the B component ($G_B$).

In the RGB format, the R component, the G component, and the B component are equal for gray colors. To set each of the R, G and B components for gray colors to one, the electronics can determine a preliminary red gain ($PG_R$) as 1/Rw, a preliminary green gain ($PG_G$) as 1/Gw, and a preliminary blue gain ($PG_B$) as 1/Bw. The electronics can normalize the values of $PG_R$, $PG_G$, and $PG_B$ by the lowest value in the group of $PG_R$, $PG_G$, and $PG_B$ to provide the red gain $G_R$, the green gain $G_G$ and the blue gain $G_B$. Since the gains are determined from weighted gray components which are a function of the weight factors, the gains are a function of the weight factors. Since the gains are a function of the weight factors and the weight factors are at least partially dependent on the brightness of the light source illuminating the scene, the gains are at least partially dependent on the brightness of the image. For instance, the gains that are determined for a set of formatted image data can be different depending on the brightness of the light source illuminating the scene at the time the image was generated.

The image component gains can be employed to correct the image for the light source based color-shift. For instance, when the image data is available in the same format as the comparison format, the components of the image data can be multiplied by the corresponding gain to correct the image for the light source based color shift. For instance, when the image data is available in RGB format and the comparison format is the RGB format, corrected image data can be generated by multiplying the R values in the image data by the red gain, the G values in the image data by the green gain, and the B values in the image data by the blue gain. When the image data is not available in the same format as the comparison format, the gains can be converted from the comparison format to the same format as the image data. Alternately, the image data can be converted to the same format as the gains. The electronics can store the corrected image data in the memory and/or display the corrected image on an output device.

Figure 3:
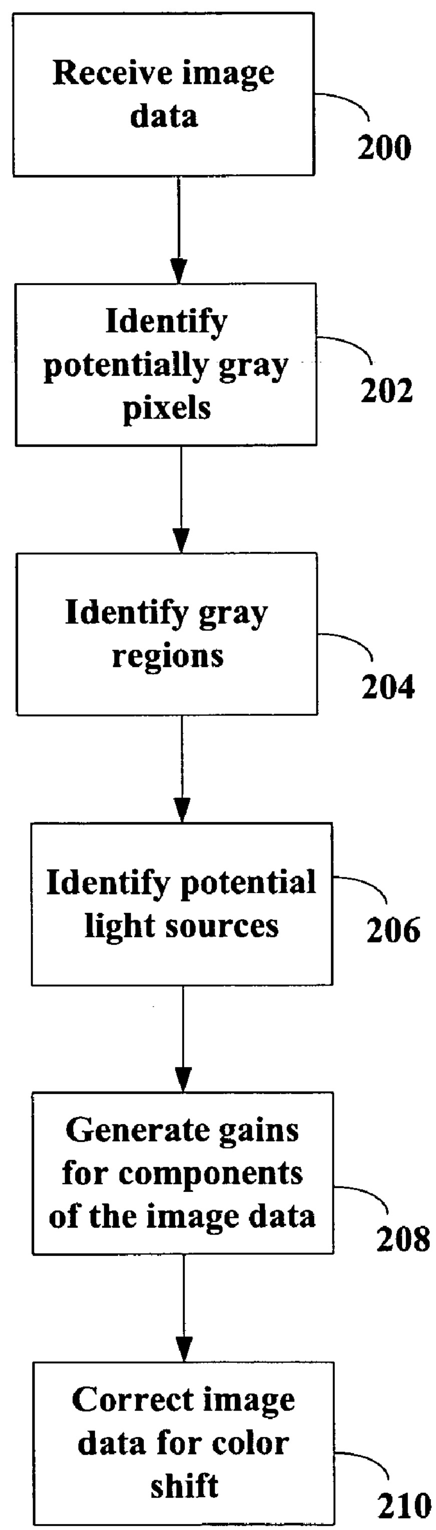
FIG. 3 is a flow diagram illustrating a method of processing image data to correct an image for light based color shift.

FIG. 3 is a flow diagram illustrating a method of processing image data to correct an image for light source based color shift. At process block 200, the image data is received. For instance, the electronics can receive the image data from the image sensor. The image data is for an image of a scene. The image data is in an initial format having image components such as RGB format. At process block 202, the gray pixels in the image are identified. For instance, the electronics can convert the image data from the initial format to a gray pixel identification format that also has image components. A suitable format for identifying gray pixels may be the YCbCr format. The components of the gray pixel identification format pixels can be compared to the criteria disclosed in Equation 1 through Equation 6 to identify pixels that are potentially gray pixels.

At process block 204, the gray regions are identified. For instance, the electronics can average the image components for the potentially gray pixels located in different regions of the image to generate regional components. The electronics can convert the regional components from the gray pixel identification format to a comparison format for comparison with reference data. For instance, the electronics can convert the regional components from a pixels identification format such as YCbCr to a comparison format such as RGB. The electronics can compare the regional components in the comparison format with the reference data to determine whether each region is a gray region. In some instances, this comparison includes determining the distance, in comparison format space, between the regions and reference points. When the distance between a region and the nearest reference point is greater than a distance limit, that region is determined not to be a gray region. When the distance between a region and the nearest reference point is within a distance limit, that region is determined to be a gray region associated with that reference point. In the event that a region is within a distance limit of more than one reference point, that region can be a gray region associated with the nearest reference point.

At process block 206, the potential light sources are identified. Since each gray region is associated with a reference point and each reference point is associated with a light source, each gray region is associated with a light source. The electronics can determine the number of gray regions associated with a light source. When the number of gray regions associated with a light source exceeds a threshold, the electronics can classify that light source as a potential light source. When the number of gray regions associated with a light source falls at or below a threshold, the electronics can classify that light source as not a potential light source. This process can be repeated for each of the light sources.

Figure 4:
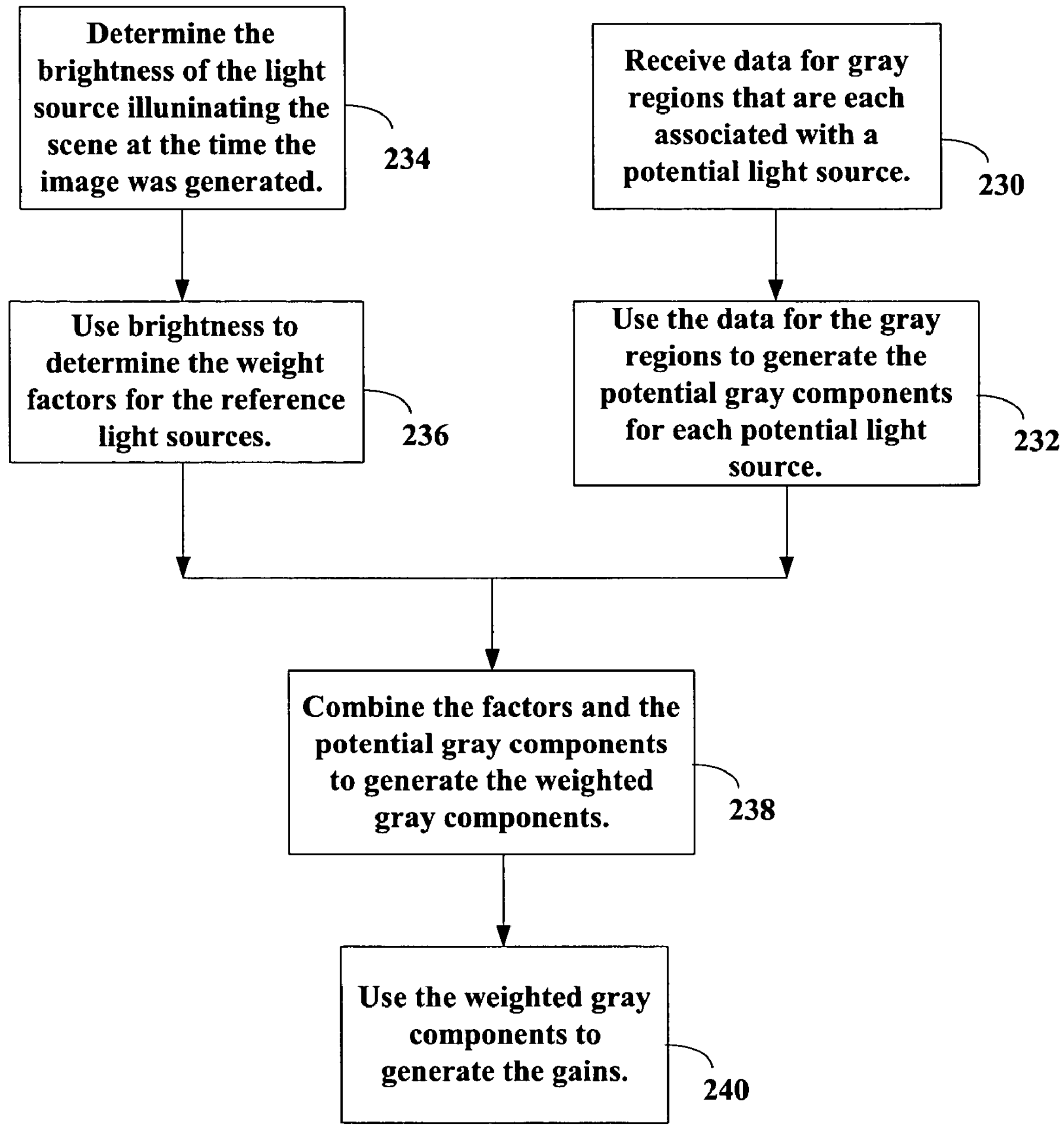
FIG. 4 is an example of a flow diagram for a suitable method of generating gains that can be employed to correct an image for light based color shift.

At process block 208, the gains for components of an image format are generated. For instance, the electronics can compare the data for the gray regions against reference data for each of the potential light sources to generate the gains. FIG. 4 is a flow diagram illustrating a suitable method of generating the gains.

At process block 210, image data is corrected for a color shift caused by the light source that was actually illuminating the scene when the image was generated. For instance, the electronics can employ the gains to correct components of image data by multiplying one or more components of the image data by the corresponding gain. The electronics can store the corrected image data in the memory and/or output the corrected image data to an output device and/or display the corrected image on an output device.

FIG. 4 is a flow diagram illustrating a suitable method of generating the gains for one or more components of an image format. At process block 230, the data for the gray regions and the potential light sources is received. For instance, the electronics can access the data generated in process block 206 of FIG. 3. At process block 232, the potential gray components for each potential light source are generated. For instance, the electronics can generate a potential gray component for a potential light source by averaging the corresponding regional components for the gray regions associated with that potential light source. The electronics can repeat the averaging process for each of the components and for each of the potential light sources.

At process block 234, the brightness of the light source that was illuminating the scene is determined. For instance, the electronics can receive the brightness from the supplemental electronics. Alternately, the electronics can receive data that indicates the brightness or that is a function of the brightness from the supplemental electronics. At process block 236, the brightness is used to determine the weight factors for each of the potential light sources. For instance, the electronics can access data associating each light source with a weight factor where the weight factor is a function of brightness from the memory. As an example, the electronics can access a look-up table that includes the data in Table 1 from the memory. The electronics can compare the brightness determine in process block 234 against the data so as to determine the weight factor for each potential light source.

At process block 238, the weight factors and the potential gray components are combined so as to generate the weighted gray components. For instance, the electronics can generate a weighted average of the potential gray components. The weighted average for a component can have the corresponding potential gray components for each potential light source weighted by the weight factor for that light source.

At process block 240, the weighted gray components are used to generate the gains. For instance, the electronics can determine a preliminary gain for a component as the inverse of the weighted gray component for that component. A preliminary gain can be determined for each of the weighted gray components. The electronics can normalize the preliminary gains by the lowest preliminary gain in order to generate the gains.

The process blocks and decision blocks illustrated in the flow diagrams of FIG. 3 and FIG. 4 can be performed in a sequence other than the illustrated sequence. For instance, FIG. 4 illustrates process block 230 and process block 232 being executed in parallel with process block 234 and process block 236. However, process block 230, process block 232, process block 234, and process block 236 can be executed in series. Additionally or alternately, portions of the disclosure for the flow diagrams of FIG. 3 and FIG. 4 are optional. For instance, the conversion from the initial format to the pixel identification format can be optional. Additionally, the conversion from the pixel identification format the comparison format can be optional.

Figure 5:
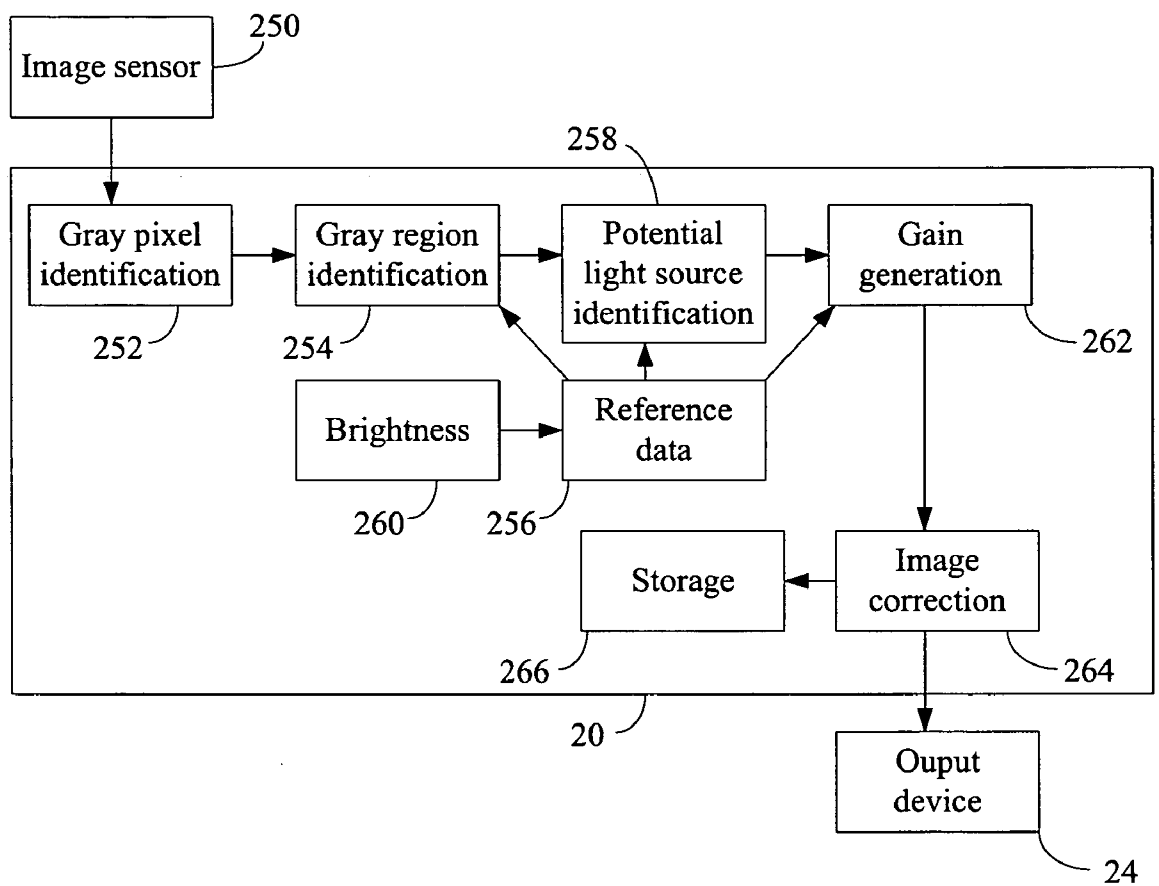
FIG. 5 is a logic flow diagram showing logic modules for processing image data in an imaging system.

FIG. 5 is a logic flow diagram showing logic modules for processing image data so as to correct for color shift. The electronics 18 include a gray pixel identification module 252 configured to receive image data from the image sensor. The gray pixel identification module 252 can process the image data so as to identify the potentially gray pixels in the image. The electronics also include a gray region identification module 254 and a reference data module 256. The reference data module 256 can store and process the reference components for reference light sources. The gray region identification module 254 can process the image data for potentially gray pixels located in different regions of the image to generate the regional components. The gray region identification module 254 can compare the regional components to the reference components to identify the gray regions.

The electronics include a potential light source identification module 258 that receives the regional component for the gray regions from the gray region identification module 254 and also receives the reference components from the reference data module 256. The potential light source identification module 258 compares the regional components for the gray regions to the reference components so as to identify the potential light sources. Each of the potential light sources is potentially the light source illuminating the scene at the time the image was taken.

The electronics also include a brightness module 260 configured to determine the brightness of a light source illuminating the scene at the time the image of the scene was generated. For instance, the electronics can receive the brightness or data indicating the brightness from the supplemental electronics. The reference data module 256 can receive the brightness from the brightness module 260 and compare the brightness to factor data. The factor data associates each light source with a weight factor that is at least partially dependent on brightness. The reference data module 256 can compare the brightness to the factor data so as to generate a weight factor for each of the light sources.

The electronics include a gain generation module 262 that receives the weight factors from the reference data module 256 and the regional data for the potential light sources from the potential light source identification module 258. The gain generation module 262 employs the regional data for the potential light sources to generate potential gray components for each potential light source. The gain generation module 262 combines the weight factors and the potential gray components to generate the gains for components of the image data.

The electronics include an image correction module 264. The image correction module employs the gains from the gain generation module to correct one or more components of the image data for color shift resulting from the light source illuminating the scene at the time the image was generated. The corrected image data can be received at an output device 24. The electronics also include a storage module 266 that can receive the corrected image data from the image correction module 264 and store the corrected image data.

Although the above disclosure is provided in the context of using the color gray, the disclosure can be employed in conjunction with other colors. Additionally, the disclosure can be employed in conjunction with formats other than the RGB and YCbCR formats.

All or a portion of one or more methods described above can be executed by the imaging system or by the electronics in the imaging system. Further, the processor can execute all or a portion of one or more of the above methods. When the electronics include a computer-readable medium, the processor can execute the instructions on the computer-readable medium. The instructions can cause the processor to execute all or the portion of one or more methods disclosed above. Additionally, all or a portion of one or more of the above methods can be executed by systems and devices other than the disclosed imaging system.

Those of skill in the art would understand that information and signals may be represented using any of a variety of different technologies and techniques. For example, data and instructions that may be referenced throughout the above description may be represented by voltages, currents, electromagnetic waves, magnetic fields or particles, optical fields or particles, or any combination thereof.

Those of skill would further appreciate that the various illustrative logical blocks, circuits, and method steps described in connection with the embodiments disclosed herein may be implemented as electronic hardware, computer software, or combinations of both. To clearly illustrate this interchangeability of hardware and software, various illustrative components, blocks, logic, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, logic, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer-readable medium known in the art. An exemplary storage computer-readable medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An imaging system comprising:

electronics configured to identify potentially gray pixels by determining if the pixel components fall within a range of values and comprising a first filter for identifying potentially gray pixels;

electronics configured to generate a gain for a component of an image format, the gain at least partially dependent on the brightness of a light source illuminating a scene when an image of the scene was generated, the gain useable to correct the component for a color shift in the image caused by the light source;

electronics configured to identify gray regions and comprising a second filter for identifying potentially gray regions; and wherein the gain is generated from a weighted average comprising a plurality of potential gray components that are each associated with a potential light source, each potential gray component in the weighted average being weighted by a factor indicating the probability that a potential light source associated with that potential gray component is a light source illuminating the scene at the time the image was generated, wherein at least a first subset of the potential gray components are associated with a first potential light source and a second subset of the potential gray components are associated with a second potential light source.

2. The system of claim 1, wherein the component is selected from a group consisting of: an R component of an RGB image format, a G component of the RGB image format, and a B component of the RGB image format.

3. The system of claim 1, wherein the component represents an optical characteristic of the image.

4. The system of claim 1, wherein the weight factors are at least partially dependent on the brightness of the light source illuminating the scene when the image of the scene was generated.

5. The system of claim 1, wherein the potential gray components are for a component selected from a group consisting of an R component of an RGB image format, a G component of the RGB image format, and a B component of the RGB image format.

6. The system of claim 1, wherein at least one potential gray component is an average of the image component for a plurality of gray pixels.

7. The system of claim 6, wherein the gray pixels included in the average for one of the potential gray components have pixel image components that when plotted in color space are clustered around a reference point in the color space, the reference point having image components for gray when illuminated by a light source associated with the reference point.

8. The system of claim 1, further comprising:

electronics for employing the gains to correct the image for the image shift.

9. The system of claim 1, comprising:

electronics for determining the brightness of the light source illuminating the scene when the image of the scene was generated;

electronics for employing the brightness to determine the weight factors, each weight factor indicating a probability that a different one of a plurality of potential light sources was illuminating the scene at the time the image was generated; and electronics for using the weight factors to determine the gain for the component.

10. The system of claim 1, further comprising:

electronics for comparing the component of the format data for different regions of pixels in the image to components of a plurality of reference points so as to determine whether the regions are gray regions; and electronics for generating the gains such that the gains are not dependent on the regions that are determined not to be gray.

11. The system of claim 1, further comprising:

electronics for generating the gains such that the gains are not dependent on the pixels that are determined not to be gray.

12. The system of claim 1 configured to generate a plurality of gains such that each gain is at least partially dependent on the brightness of the light source illuminating the scene when the image of the scene was generated, and each gain can be used to correct a different component of the image format for a color shift in the image caused by the light source.

13. The system of claim 1, wherein fewer than all the pixels are sampled to determine potentially gray components.

14. The system of claim 1, wherein the image pixels are in YCbCr format and the electronics configured to identify if pixels are gray makes reference to the equations $Y<Y_{max}$, $Y>Y_{min}$, Cb<m1*Cr−c1, Cr>m2*Cb+c2, Cb>m3*Cr+c3, Cr<m4*Cb+c4.

15. A mobile camera phone, comprising:

electronics for determining brightness of a light source illuminating a scene when an image of the scene was generated;

electronics for employing the brightness to determine a plurality of factors, each factor indicating a probability that a different one of a plurality of potential light sources is the light source illuminating the scene at the time the image was generated;

electronics configured to identify potentially gray pixels and comprising a first filter for identifying potentially gray pixels;

electronics configured to identify gray regions and comprising a second filter for identifying potentially gray regions, and electronics for generating a weighted gray component, the weighted gray component comprising a weighted average comprising potential gray components that are each associated with a potential light source, the potential gray component generated by at least determining which of pixels determined to be gray have components falling within a range of a reference component associated with a particular potential light source indicating the value that the component would have for the color gray when it is illuminated by that potential light source, each potential gray component in the weighted average being weighted by the factor indicating the probability that the potential light source associated with that potential gray component was a light source illuminating the scene at the time the image was generated, wherein at least a first subset of the potential gray components are associated with a first potential light source and a second subset of the potential gray components are associated with a second potential light source; and electronics for using the weighted gray component to generate a gain for a component of a format for data for the image; and electronics for using the gain to correct the component for a color shift caused by the light source illuminating the scene at the time the image was generated.

16. The phone of claim 15, wherein the component of data for the image is selected from a group consisting of: an R component of an RGB image format, a G component of the RGB image format, and a B component of the RGB image format;

the potential gray components are selected from a group consisting of an R component of an RGB image format, a G component of the RGB image format, and a B component of the RGB image format; and the weighted gray component is selected from a group consisting of a weighted R component of an RGB image format, a weighted G component of the RGB image format, and a weighted B component of the RGB image format.

17. The system of claim 15, wherein the weighted gray component $C_A$ is determined by summing the potential gray components of each light source, where each component is weighted by the equation $(W_A)/(W_{Tot})$, $W_A$ being the weight factor for the particular light source and $W_{Tot}$ being the sum of the weight factors for all the light sources.

18. The device of claim 15, wherein the electronics for determining brightness of a light source illuminating a scene comprise auto-exposure control logic.

19. An imaging system, comprising:

means for receiving data for an image of a scene;

means for identifying potentially gray pixels by determining if the pixel components fall within a range of values and comprising a first filter for identifying potentially gray pixels;

means for identifying gray regions comprising a second filter for identifying potentially gray regions;

means for generating a gain for a component of an image format, the gain being at least partially dependent on a brightness of a light source illuminating the scene when the image was generated; and means for using the gain to correct the component for a color shift in the image caused by the light source, wherein the gain is generated from a weighted average comprising a plurality of potential gray components that are each associated with a potential light source, each potential gray component in the weighted average being weighted by a factor indicating the probability that a potential light source associated with that potential gray component is a light source illuminating the scene at the time the image was generated, wherein at least a first subset of the potential gray components are associated with a first potential light source and a second subset of the potential gray components are associated with a second potential light source.

20. The system of claim 19, wherein means for generating the gain includes means for employing the brightness to determine the factors.

21. The system of claim 19, wherein the component is selected from a group consisting of: an R component of an RGB image format, a G component of the RGB image format, and a B component of the RGB image format.

22. A computer-executable program stored on a computer-readable medium which causes a computer to execute the steps of:

receiving data for an image of a scene;

identifying potentially gray pixels by determining if the pixel components fall within a range of values and using a first filter to identify potentially gray pixels;

identifying gray regions by using a second filter to identify potentially gray regions; and generating a gain for a component of an image format, the gain being at least partially dependent on a brightness of a light source illuminating the scene when the image was generated, wherein the gain is generated from a weighted average comprising a plurality of potential gray components that are each associated with a potential light source, each potential gray component in the weighted average being weighted by a factor indicating the probability that a potential light source associated with that potential gray component is a light source illuminating the scene at the time the image was generated, wherein at least a first subset of the potential gray components are associated with a first potential light source and a second subset of the potential gray components are associated with a second potential light source.

23. The program product of claim 22, wherein generating the gain includes employing the brightness to determine the factors.

24. The program product of claim 22, wherein the component is selected from a group consisting of: an R component of an RGB image format, a G component of the RGB image format, and a B component of the RGB image format.

25. A method of processing image data, comprising:

identifying potentially gray pixels by determining if the pixel components fall within a range of values and using a first filter to identify potentially gray pixels;

identifying gray regions by using a second filter to identify potentially gray pixels; and generating a gain for a component of data for an image of a scene, the gain being generated such that the gain is at least partially dependent on a brightness of a light source illuminating the scene when the image was generated, wherein the gain is generated from a weighted average comprising a plurality of potential gray components that are each associated with a potential light source, each potential gray component in the weighted average being weighted by a factor indicating the probability that a potential light source associated with that potential gray component is a light source illuminating the scene at the time the image was generated, wherein at least a first subset of the potential gray components are associated with a first potential light source and a second subset of the potential gray components are associated with a second potential light source; and using the gain to correct the component for color shift in the image caused by the light source.

26. The method of claim 25, wherein the component is selected from a group consisting of: an R component of an RGB image format, a G component of the RGB image format, and a B component of the RGB image format.

27. The method of claim 25, wherein generating the gain includes employing the brightness to determine a plurality of factors, each factor indicating a probability that a different one of a plurality of potential light sources is the light source illuminating the scene at the time the image was generated.

* * * * *